(12) United States Patent
Berndorfer et al.

(10) Patent No.: US 11,917,981 B2
(45) Date of Patent: Mar. 5, 2024

(54) APPARATUS FOR IDENTIFYING AN ANIMAL

(71) Applicant: RAMSEIER COATINGS AG, Rubigen (CH)

(72) Inventors: Wolfgang Berndorfer, Natternbach (AT); Jürg Hofmann, Rubigen (CH)

(73) Assignee: RAMSEIER COATINGS AG, Rubigen (CH)

( * ) Notice: Subject to any disclaimer, the term of this patent is extended or adjusted under 35 U.S.C. 154(b) by 138 days.

(21) Appl. No.: 17/252,968

(22) PCT Filed: Jun. 18, 2019

(86) PCT No.: PCT/EP2019/066083
§ 371 (c)(1),
(2) Date: Dec. 16, 2020

(87) PCT Pub. No.: WO2019/243361
PCT Pub. Date: Dec. 26, 2019

(65) Prior Publication Data
US 2021/0127633 A1    May 6, 2021

(30) Foreign Application Priority Data
Jun. 18, 2018   (AT) .............................. A 50485/2018

(51) Int. Cl.
*A01K 11/00* (2006.01)
*E06B 7/32* (2006.01)
*G07C 9/37* (2020.01)

(52) U.S. Cl.
CPC .............. *A01K 11/006* (2013.01); *E06B 7/32* (2013.01); *G07C 9/37* (2020.01)

(58) Field of Classification Search
CPC .................................. A01K 5/025; E06B 7/32
(Continued)

(56) References Cited

U.S. PATENT DOCUMENTS 2,756,466 A    7/1956   Garland
5,992,096 A    11/1999  De La Cerda et al.
(Continued)

FOREIGN PATENT DOCUMENTS

DE        19708262 A1    9/1998
DE      202005014531 U1   11/2005
(Continued)

OTHER PUBLICATIONS

International Search Report and Written Opinion in International Application No. PCT/EP2019/066083, dated Oct. 15, 2019, 16 pages.

*Primary Examiner* — Joshua J Michener
*Assistant Examiner* — Henry Hooper Mudd
(74) *Attorney, Agent, or Firm* — Liang & Hennessey LLP; Brian Hennessey

(57)    ABSTRACT

The invention relates to a device for identifying an animal comprising an image recording device for recording images of an animal located in proximity to the device, a database, in which database reference images of typical procedures of approach of the first animal are stored, wherein a degree of matching between the images and the reference images and/or between features of the images and features of the reference images is determined and wherein, depending on the degree of matching, a drive for opening a door is actuated and/or a signalling unit for issuing an alert tone or a signalling unit for issuing a luring sound is activated and/or an issuing unit for issuing feed is activated via a control device.

12 Claims, 1 Drawing Sheet

(58) Field of Classification Search
USPC .................. 119/51.02; 340/573.1, 573.3
See application file for complete search history.

(56) References Cited

U.S. PATENT DOCUMENTS

| | | | |
|---|---|---|---|
| 6,297,739 B1 | 10/2001 | Small | |
| 6,560,926 B1 | 5/2003 | Gillett | |
| 2003/0126977 A1* | 7/2003 | Garcia | B64D 1/04 |
| | | | 89/1.11 |
| 2006/0101738 A1 | 5/2006 | Lethers et al. | |
| 2008/0036611 A1 | 2/2008 | Noblitt | |
| 2008/0282988 A1 | 11/2008 | Bloksberg | |
| 2010/0328030 A1* | 12/2010 | Hill | G08B 29/00 |
| | | | 340/5.61 |
| 2010/0332140 A1 | 12/2010 | Joyce et al. | |
| 2011/0297090 A1* | 12/2011 | Chamberlain | A01K 5/02 |
| | | | 119/51.02 |
| 2014/0090299 A1* | 4/2014 | Brown | E06B 7/32 |
| 2015/0216145 A1* | 8/2015 | Nelson | A01K 39/01 |
| 2016/0086403 A1* | 3/2016 | Litterer | G07C 9/00 |
| 2016/0255807 A1 | 9/2016 | Noblitt | |
| 2017/0273277 A1* | 9/2017 | Monk | A01K 5/02 |

FOREIGN PATENT DOCUMENTS

| | | |
|---|---|---|
| DE | 202008000934 U1 | 4/2008 |
| DE | 102014101167 A1 | 7/2015 |
| EP | 2484856 A2 | 8/2012 |
| KR | 20030037910 A | 3/2003 |
| WO | 2009128870 A1 | 10/2009 |

* cited by examiner

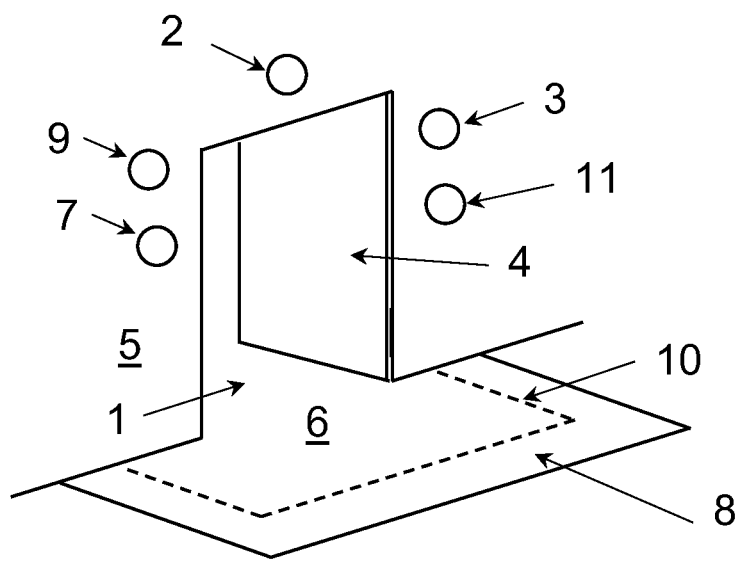

APPARATUS FOR IDENTIFYING AN ANIMAL

CROSS-REFERENCE TO RELATED APPLICATIONS

The present application is a national phase application of PCT Application No. PCT/EP2019/066083, filed Jun. 18, 2019, entitled "APPARATUS FOR IDENTIFYING AN ANIMAL", which claims the benefit of Austrian Patent Application No. A 50485/2018, filed Jun. 18, 2018, each of which is incorporated by reference in its entirety.

BACKGROUND OF THE INVENTION

1. Field of the Invention

The present invention relates to a device for identifying a first animal, which device is coupled to a control unit for actuating a drive for opening and/or closing a door as well as for issuing a tone by a tone issuing unit.

2. Description of the Related Art

U.S. Pat. No. 2,756,466 discloses an animal door, which animal door is part of a typical door intended for humans. There is no indication in U.S. Pat. No. 2,756,466 of a drive for opening and/or closing the door depending on the presence of an animal or the issuing of signal depending on the presence of an animal.

WO2009128870 is about an animal hatch. There is no indication in WO2009128870 of a drive for opening and/or closing the animal hatch, or for controlling said drive. Also, the device described in WO2009128870 does not comprise a device for issuing a signal depending on the presence of an animal.

U.S. Pat. No. 5,992,096 describes an animal hatch comprising a detection unit, which detection unit detects a present animal, and a reading unit for reading out an ID of said animal. The device of U.S. Pat. No. 5,992,096 locks or unlocks the animal hatch depending on the read-out ID.

DE202008000934 mentions a device for opening a door depending on the read-out ID of an animal approaching the door.

DE19708262 discloses a door element to be inserted into a door opening, which door element can be locked or bolted.

DE202005014531 describes an automatically actuated door, which door is opening by means of a controller depending on a read-out code. The device described in DE202005014531 is based on RFID technology.

U.S. Pat. No. 6,560,926 describes an animal door, which can be remote-controlled by a user.

US2006101738A1 describes an animal door comprising no controller or drive for opening it.

EP2484856 describes an animal door, which is characterised by good thermal properties. In addition, EP2484856 indicates a possibility of recognising animals, which is essentially characterised by the feature that only parts of the code need to be able to be read.

US20080036611, U.S. Pat. No. 6,297,739B1 and DE102014101167A1 fail to disclose the matching of images of the animal's approach of the device according to the invention with reference images.

The prior-art documents mentioned above disclose devices for opening a door in order to allow an animal to enter after reading out a code and matching said code with a reference code. However, reading out a code is difficult to implement in real life, since it requires the entire code or—as disclosed in EP2484856—at least essential parts of the code to be able to be read out.

Still, reading out codes remains a difficult endeavour with animals, since it requires the animal to actually wear the storage medium including the code and the ability to establish contact between the storage medium and the reader. It is for this reason that we do not consider code matching a suitable primary criterium for decision-making.

An object of the invention disclosed herein is to improve the devices for identifying animals known in prior art in order to open an animal hatch or issuing a signal based on such unique identification of the animal.

SUMMARY OF THE INVENTION

A person as well as an animal will identify a first animal primarily by its appearance. An object of the present invention is to imitate said primary identification of a first animal known from nature using technological means.

The device for identifying an animal according to the invention includes an image recording device for recording images of an animal located in proximity to the device, and a database, in which database reference images of the appearance of a first animal and/or typical procedures of approach of the first animal are stored. In the device according to the invention, a degree of matching between the images and the reference images and/or between features of the images and features of the reference images is determined and wherein, depending on the degree of matching, a drive for opening a door is actuated and/or a signalling unit for issuing an alert tone or a signalling unit for issuing a luring sound is activated and/or an issuing unit for issuing feed is activated via a control device.

The image recording device may be a prior-art photo camera or video camera. Prior-art thermographic cameras may also be employed.

The images and reference images may comprise image data based on which parameters such as the shape of the first animal, the colour of the first animal or the predominant colour of the first animal, the fur pattern of the first animal or the way the animal approaches can be determined using prior-art methods. Based on said image data, biometric data, preferably characteristic biometric data of the first animal can be determined.

Based on one or preferably more of the parameters set out above by way of example, a degree of likeness to a reference parameter is calculated.

In the context of this discussion, the calculation of a degree of likeness between an image and a reference image is considered equivalent to the calculation of a degree of likeness between a parameter and a reference parameter, seeing as the parameter and the reference parameter are determined from the image or the reference image, respectively.

When a defined threshold value is exceeded, the animal located in the proximity of the device according to the invention is recognised as a first animal, which first animal is to be allowed to be present in the zone of the device according to the invention. Subsequently, the first animal may be allowed to enter through a door closing an opening, for which purpose the door has to be unlocked and/or opened. The device according to the invention may issue a luring sound for the purpose of continued presence of the first animal in the proximity of the device according to the invention. A luring sound is essentially a sound pleasant to the first animal's ears.

The luring sound may cause the animal to pass through the opened door and/or to open an unlocked door. Other than the devices known from prior art, this is characteristic of the device according to the invention, since a door opened based on a read-out and matched code will by no means cause the animal identified as the first animal to pass through said door.

Analogously to the issuing of a luring sound, feed may also be issued in order to encourage the first animal to pass through the opened animal hatch or to open an animal hatch or to remain next to the device according to the invention.

The issuing of luring sounds and/or the issuing of feed may be used to teach the animal to open the unlocked door and/or to pass through the opened door. The issuing of the luring sound and the issuing of feed may also be done by a person.

The luring sound or the feed may preferably be arranged on that side of the animal hatch which is opposite the current location of the first animal in order to encourage the animal to pass through the animal hatch.

When a defined threshold value of likeness is not reached, the animal located in the proximity of the device according to the invention can be recognised as a second animal.

An animal can also be recognised as a second animal when the animal originally to be classified as the first animal brings an unwanted object such as, for example, a killed mouse or is, for example, soiled. The device according to the invention can then prevent an animal with capture between its jaws to enter through the animal hatch and take such capture to the house. An animal with capture can be recognised as having a shape and/or colour and/or image values different from a reference shape or colour or reference values, respectively.

Also, a soiled animal may be prevented from entering the house, since a soiled animal has different colour values.

An alert tone may be issued, encouraging the second animal to leave the zone around the device according to the invention and, optionally, to refrain from passing through the animal hatch.

The skilled person will select the threshold value of likeness based on their experience and the technological possibilities of identifying the animal.

It can also be determined using the image recording device how the animal approaches the device according to the invention and thus the animal hatch. Using common practice, the trajectory by which the animal approaches the device according to the invention may be recorded. The trajectory may be matched with a reference trajectory, so that the animal can be identified assuming that every animal has its characteristic way of approaching an animal hatch.

The image recording device can also be used to read out a code indicating the image data that is attached to the animal. A visually readable code such as, a bar code, QR code, for example, may be matched with codes stored in a database for identifying the animal.

The device according to the invention may include pressure sensors, which pressure sensors are arranged in a zone, which zone the animal enters when approaching the device and/or the door.

Using the pressure sensors, the weight and/or characteristic pace of the animal may be determined. Determination of weight will also enable recognition of whether the animal carries capture and thus additional weight.

The skilled person may provide the pressure sensors as a means of verifying the identification according to the above methods. The disclosure of the invention does not preclude the pressure sensors being employed as a simple means of identifying the animal irrespective of other measurement methods.

The device according to the invention can also comprise a reader for reading out a code, which code is stored in a storage medium attached to the animal.

A stored code associated with the animal can be read out using prior-art methods and matched with a reference code. Reading out stored codes may be used for the verification of other methods of identifying the animal.

The device may comprise a smell sensor for determining a smell of the first animal, wherein said smell of the first animal is matched with a reference smell stored in the form of reference data.

Also, in common practice, animals recognise each other through their smell. It is possible in prior art to determine a smell by means of technological measurement methods. Via determining the smell, it is possible to determine, in addition to the smell of the animal, another smell of a killed animal, which the animal carries between its jaws, and to thus identify the killed animal as a second animal.

The use of smell sensors may serve to verify an identification of an animal performed using other technological measurement methods. This implies the combination of measurement methods.

The device may comprise a structurally closed space, by which space the determination of the smells is facilitated, since the abundance of measurable smells is reduced.

The disclosure of the invention does not preclude smell sensors to be used as simple measuring means for identifying the animal irrespective of other measurement methods.

The above methods for identifying an animal are generally based on a current measurement value of an animal being determined and matched with a reference measurement value. The current measurement value and the reference value may be an image value or a parameter to be determined from the image value, such as a trajectory, a shape or a colour value, a value to be determined by a pressure sensor, a code or a smell value.

In order to ensure reliability of the device according to the invention and the method to perform therewith, continuous change in the animal and its habits should be taken into consideration. The method may comprise self-learning routines. The measurement values exhibiting a minimum degree of likeness to the reference values may be stored in the database as reference values. This will continuously expand the database of reference values, which has, among others, the effect that changes in the animal are taken into consideration.

The device may comprise a locking device for locking the door.

BRIEF DESCRIPTION OF THE DRAWINGS

The subject-matter of the invention is shown in FIG. 1 below, with the following reference numerals each designating the elements that follow them.

1 opening
2 camera
3 signalling unit for issuing an alert tone
4 door
5 wall
6 pressure sensor
7 smell sensor
8 zone
9 signalling unit for issuing a luring signal
10 limit
11 reader

DETAILED DESCRIPTION

FIG. 1 shows a potential embodiment of the device according to the invention, which device finds use for an opening 1 in a wall 5, which opening 1 is closable by a door 4. Arrangement of the door 4 within the opening 1 of the wall 5 follows the prior art.

The subject-matter of the invention disclosed herein and the discussion of the invention primarily relate to a device for identifying an animal so that an identified animal can be lured and/or allowed through the opening 1 or be rejected.

The embodiment shown in FIG. 1 comprises a camera 2, which camera 2 serves as an image recording device for recording images of an animal located in the proximity of the device. The skilled person will define the zone 8 of proximity by the zone recorded by the camera 2. The skilled person may direct the inclination of the camera 2 and choose the focus of the camera 2 such that image data of a uniquely and clearly defined zone 8 around the opening 1 are generated using the camera 2. The zone 8 is clearly delineated by its limit 10 and the wall 5. The limit 10 may be defined by the image zone of the camera 2 and/or by the focused zone of the camera 2.

The device according to the invention further comprises a database, in which database reference images indicating the appearance of a first animal and/or typical procedures of approach by the first animal are stored.

The database, which is not shown in FIG. 1, comprises, for example, reference image data of the pet, also not shown in FIG. 1, which pet is typically to be allowed through the opening 1. The image data comprises views of the pet's side, with which side the pet approaches the camera 2. The image data of the pet may be generated using the camera 2 of the device according to the invention.

The database can further comprise reference image data and data derived therefrom, such as trajectories, vectors and the like of typical procedures of approach of the opening 1 by the pet.

Using prior-art methods, a degree of matching between the images determined in real time using the camera 2 or image data and the reference images or reference image data, respectively, is determined. The degree of matching indicates, by a numerical value, a likeness between the image or the image data derived therefrom and the reference image or reference image data derived therefrom, respectively. Such methods for matching an image or image data derived therefrom to a reference image or reference image data, respectively, are known in prior art.

Depending on the degree of matching, a drive for opening an animal hatch is actuated and/or a signalling unit for issuing an alert tone 3 or a signalling unit for issuing a luring sound 9 is activated and/or an issuing unit for issuing feed is activated via a control device.

The degree of matching may equal or exceed a threshold value for performing the above actions.

The device shown in FIG. 1 comprises pressure sensors 6, which pressure sensors 6 are arranged in a zone 8, which zone 8 the animal enters when approaching the device and/or the door 4. The exemplary embodiment shown in FIG. 1 relates to the special case in which the zone 8 monitored by the camera 2 and the zone 8 in which the pressure sensors 6 are arranged are coincident.

The camera 2 may be activated using the pressure sensors 6.

Further, the weight of the animal 2 entering the zone 8 may be determined using the pressure sensors 6 and said weight determined using the pressure sensors 6 may be matched with a reference weight stored in the database for identifying the animal. The weight determined by the pressure sensors 6 may thus be used as a further criterium for identifying the animal.

The device comprises a reader 11 for reading out a code, which code is stored in a storage medium attached to the animal. Codes in the form of ID tags are prior art, for example, to identify dogs, wherein the animal carries a code stored in a chip. The code can be read out using prior-art equipment, so that the code can be used as a further criterium for identifying the animal.

Reading out a code can take some time depending on the length of the code and the method applied. Advantageously, the code will be used as a further criterium for identifying the animal in such a manner that only parts of the code are read out.

The device according to the invention comprises a smell sensor 7 for determining a smell of the first animal, which smell of the first animal is matched with a reference smell stored in the form of reference data and thus presenting a further criterium for identifying the animal. A smell sensor 7 is known in prior art.

The invention claimed is:

1. A device for determining whether to at least one of open and unlock a door for an animal, comprising:
    an image recording device adapted to capture images of an approach procedure of the animal located in proximity to the device, the approach procedure comprising a trajectory of the animal;
    a pressure sensor in proximity to the door configured to capture a weight;
    a database adapted to store reference images of a reference trajectory of characteristic procedures of approach of the animal; and
    a control device coupled to the database and the image recording device, the control device determining a degree of matching between the trajectory and the reference trajectory and actuating a drive for at least one of opening and unlocking the door if the degree of matching exceeds a threshold value;
    wherein the control device is further configured to determine if the animal is holding a captured animal in jaws of the animal by at least one of:
        comparing the images and the reference images; and
        comparing the weight captured by the pressure sensor with a reference weight of the animal; and
    wherein the drive for opening the door is actuated only if the animal is identified as not holding the captured animal in the jaws.

2. The device of claim 1, wherein, depending on the degree of matching, a signalling unit for issuing an alert tone is activated via the control device.

3. The device of claim 1, wherein, depending on the degree of matching, a signalling unit for issuing a luring sound is activated via the control device.

4. The device of claim 1, wherein, depending on the degree of matching, an issuing unit for issuing feed is activated via the control device.

5. The device of claim 1, wherein:
    the determining of the degree of matching between the trajectory and the reference trajectory comprises determining a further degree of matching between features of the images and reference features of the reference images; and the features comprise at least one of:
  a shape of the animal,
  a color of the animal,
  a predominant color of the animal, and
  a fur pattern of the animal.

6. The device of claim 1, wherein further reference images of an appearance of a first animal are stored in the database.

7. The device of claim 1, wherein the device comprises a reader for reading out a code, which code is stored in a storage medium attached to the animal.

8. The device of claim 1, further comprising:
  a smell sensor for determining the smell of the animal;
  wherein a smell of the animal is matched with a reference smell stored in a form of reference data.

9. The device of claim 1, further comprising a locking device for locking the door.

10. A device for determining whether to one of open a door, signal, and issue feed for an animal, comprising:
  an image recording device adapted to capture images of an approach procedure of the animal located in proximity to the device, the approach procedure comprising a trajectory of the animal;
  a database adapted to store reference images of a reference trajectory of characteristic procedures of approach of the animal;
  a pressure sensor in proximity to the door configured to capture a weight; and
  a control device coupled to the database and the image recording device, the control device determining a degree of matching between:
    the trajectory and the reference trajectory; and
    first features of the images and second features of the reference images;
  wherein, depending on the degree of matching, the control device activates one of:
    a drive for opening a door;
    a signalling unit for issuing one of an alert tone and a luring sound; and
    an issuing unit for issuing feed;
  wherein the control device is further configured to determine if the animal is holding a captured animal in jaws of the animal by at least one of:
    comparing the images and the reference images; and
    comparing the weight captured by the pressure sensor with a reference weight of the animal; and
  wherein the drive for opening the door is actuated only if the animal is identified as not holding the captured animal in the jaws.

11. The device of claim 10, wherein the control device activates the one of the drive, the signalling unit, and the issuing unit if the degree of matching exceeds a threshold value.

12. A method for determining whether to at least one of open and unlock a door for an animal, comprising:
  capturing images of an approach procedure of the animal, the approach procedure comprising a trajectory of the animal;
  storing reference images of a reference trajectory of characteristic procedures of approach of the animal;
  comparing the trajectory to the reference trajectory;
  actuating a drive for at least one of opening and unlocking the door if a degree of matching between the images and the reference images exceeds a threshold value; and
  determining if the animal is holding a captured animal in jaws of the animal by at least one of:
    comparing the images and the reference images; and
    comparing a weight captured by a pressure sensor in proximity to the door with a reference weight of the animal;
  wherein the drive for at least one of opening and unlocking the door is actuated only if the animal is identified as not holding the captured animal in the jaws.

* * * * *